United States Patent [19]
Contzen et al.

[11] Patent Number: 4,647,011
[45] Date of Patent: Mar. 3, 1987

[54] MAGNETIC VALVE FOR USE WITH VACUUM

[75] Inventors: Franz-Peter Contzen; Gerhard Jokisch; Francesco Vittori, all of Cologne, Fed. Rep. of Germany

[73] Assignee: Leybold-Heraeus GmbH, Koeln, Fed. Rep. of Germany

[21] Appl. No.: 749,931

[22] Filed: Jun. 27, 1985

[30] Foreign Application Priority Data

Aug. 23, 1984 [DE] Fed. Rep. of Germany ....... 3431037

[51] Int. Cl.[4] .......................... F16K 51/02; F16K 1/48
[52] U.S. Cl. ................................. 251/129.15; 251/86; 403/39; 403/134; 403/128
[58] Field of Search .............. 251/86, 88, 355, 129.15; 403/39, 132, 134, 128, 130

[56] References Cited
U.S. PATENT DOCUMENTS

| | | | |
|---|---|---|---|
| 1,694,595 | 12/1928 | Howard | 251/88 |
| 1,789,340 | 1/1931 | Melling | 251/355 X |
| 2,735,047 | 2/1956 | Garner et al. | 251/86 X |
| 2,875,975 | 3/1959 | Hajny | 251/86 |
| 3,967,907 | 7/1976 | Schmidt | 403/39 X |
| 4,114,850 | 9/1978 | Alamprese | 251/88 X |

Primary Examiner—Arnold Rosenthal
Attorney, Agent, or Firm—Felfe & Lynch

[57] ABSTRACT

A magnetic valve for use with vacuum which has an improved junction between the stem and the valve disk which prevents detritus from impairing the seal of the valve. The valve has a magnetic drive coil outside a vacuum tight casing and an armature within the casing to which a valve stem is connected. A junction between the valve stem and the valve disk includes a head on one of the two components and a beaded margin enveloping the head on the other of the two components. An annular gasket is disposed between the head and the beaded margin.

3 Claims, 3 Drawing Figures

MAGNETIC VALVE FOR USE WITH VACUUM

This invention relates to a magnetic valve for use with vacuum, having a vacuum-tight casing with two connection openings, having a magnetic drive including a coil disposed outside of the casing and an armature disposed within the casing, having a valve stem fastened to the armature, having a valve disk borne by the valve stem and associated with one of the connection openings, and having a connection between the valve stem and the valve disk which includes a head-like configuration on one of the two components and a beaded margin enveloping the head.

Vacuum valves generally require a hermetically sealed casing, since the pressure ratio between the atmospheric pressure and the pressure within the valve often amounts to nine powers of ten and more. Furthermore, especially in vacuum valves of relatively great nominal sizes, the connection between the stem and the disk must be such that slight rocking movements of the disk are possible for the purpose of achieving a uniform distribution of the thrust over the sealing surface. Lastly, vacuum valves are extremely sensitive to contamination. Even small amounts of dust on the sealing surfaces can impair the seal of the valve on account of the high pressure ratios.

Consequently a spring bellows is known and commonly used which surrounds the valve stem which is brought out of the casing, and which is welded to the valve disk, and is sealed to the valve casing by static gaskets. The use of such a spring bellows has the advantage, in addition to sealing off the interior, that any detritus produced in the area of the junction permitting adaptive movements between the valve stem and the valve disk will be unable to enter the interior of the valve and thus reach the sealing surfaces on the valve seat and disk.

In magnetic valves the use of spring bellows, however, has some disadvantages. For one thing, there is the need to use relatively large-size magnetic drives so as to be able to overcome the additional forces that act on the disk as a result of the spring bellows on which the pressure of the atmosphere is acting. Furthermore, in magnetic valves there is the general disadvantage of very severe closing impact, and the larger the magnetic drive is, the more severe the impact becomes, This impact results in rapid wear of the spring bellows, so that magnetic valves with spring bellows have only a limited useful life.

It is therefore known to design magnetic valves to be completely encapsulated, i.e., with no shaft packing and no spring bellows, so that smaller magnetic drives can be used. In this design the valve stem and the valve disk, and hence the junction between them, are situated within the casing, i.e., in the vacuum. If this junction is such that it permits adaptive movements, then some wear, be it ever so slight, is unavoidable. The detritus from this wear reaches the sealing surfaces and impairs the quality of the seal. In one known design the margin of the valve disk is beaded around the head-shaped free end of the valve stem so as to allow adaptive movements of the valve disk. In addition, the valve disk is under the action of a spiral spring disposed between the disk and the casing, so that the junction between the disk and the stem is spring-loaded. Not only as a result of the adaptive movements of the valve disk, but also because of the torque exerted by the spiral spring on the disk, attrition in the course of several thousands of operations produces detritus which impairs the seal of the valve. Furthermore, the attrition can enlarge the mouth of the bead, loosening the spring-loaded junction between the disk and the stem, and the valve becomes unusable.

The problem to which the present invention is addressed is to create an improved junction between the stem and the valve disk in a magnetic valve of the kind specified above.

This problem is solved in accordance with the invention by providing an annular gasket between the head and the beaded margin. In a junction constructed in this manner the head and the beaded margin no longer contact one another directly, so that detritus from wear can no longer be formed in this area to interfere with the operation of the valve. Furthermore, the annular gasket defines a chamber sealed off from the interior of the valve, so that any detritus that does form in this chamber is unable to escape from it and impair the seal of the valve. Furthermore, by putting a lubricant in this chamber the formation of detritus therein can be eliminated or largely suppressed. In this case the annular gasket additionally serves the purpose of preventing the escape of the lubricant to the interior of the valve. Lastly, the gasket damps the transmission of the abrupt movements of the armature to the valve disk and thus additionally contributes to the length of its useful life.

For a better understanding of the invention, together with other and further objects thereof, reference is made to the following description, taken in connection with the accompanying drawings, and its scope will be pointed out in the appended claims.

In accordance with the invention, a magnetic valve for use with vacuum comprises a vacuum-tight casing having two connection openings and a magnetic drive which includes a coil disposed outside of the casing and an armature disposed within the casing. The valve also includes a valve stem connected to the armature. The valve also includes a valve disk carried by the valve stem and associated by the connection openings, the valve disk and the valve stem being two components. The valve also includes a junction between the valve stem and the valve disk including a head-like configuration on one of the aforesaid two components and a beaded margin enveloping the head-like configuration on the other of the aforesaid two components. The valve also includes an annular gasket between the head-like configuration and the beaded margin.

Referring now to the drawings.

Figure 1:
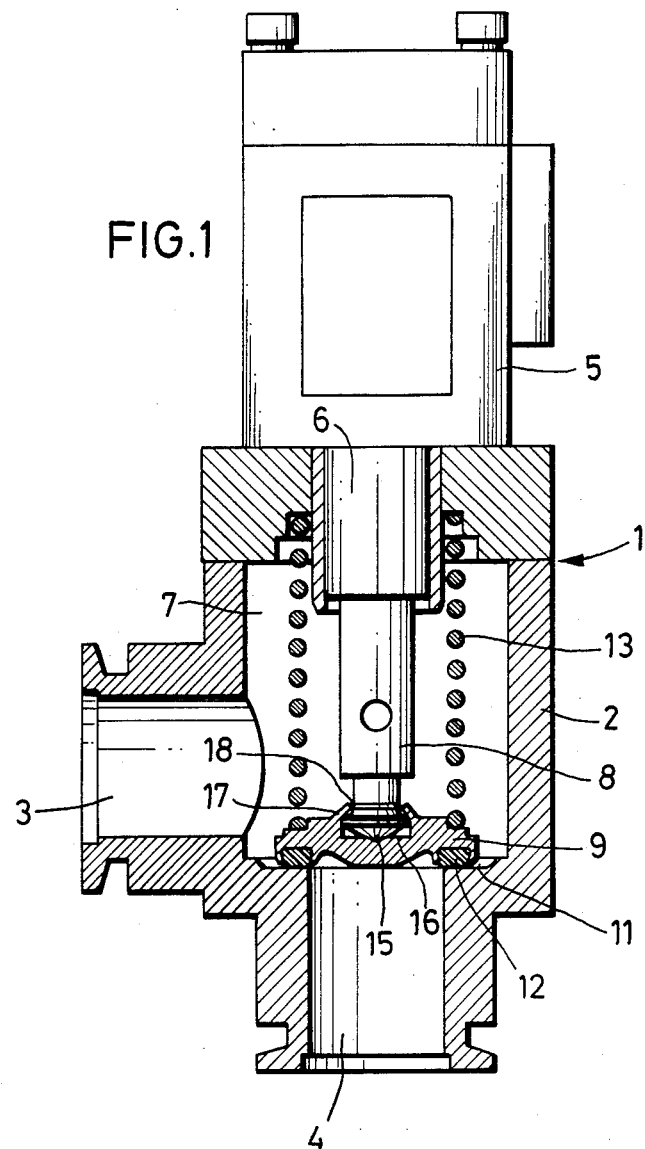
FIG. 1 is a diagrammatic sectional view of a magnetic valve constructed in accordance with the invention.

The magnetic valve 1 represented in FIG. 1 includes the casing 2 with the connection openings 3 and 4 as well as the magnetic drive generally identified as 5. The magnetic driving coil, not shown in detail, is situated outside of the casing 2, while the partially represented armature 6 is situated in the inner chamber 7 of the casing 2. Thus it is possible for the casing 2 to be hermetically sealed.

To the armature 6 there is affixed the valve stem 8 which in turn bears on its free end the valve disk 9. The valve disk 9 is associated with the connection opening 4 which is surrounded by a valve seat 11. On its side facing the valve seat 11 the valve disk 9 has an annular gasket 12 which, in the closed state of the valve as represented, engages the seat 11. The spiral spring 13, which is disposed between the disk 9 and the casing 2, serves to produce the necessary sealing force.

To hold the valve disk 9 on the valve stem 8, a junction is provided which permits slight rocking movements of the valve disk 9 relative to the valve stem 8. To this end, the valve stem 8 has on its lower end a head-like configuration (head 15). With this head 15 there is associated a recess 16 with a raised margin 17. The beaded margin 17 envelops the head 15, resulting in a reliable junction between the valve stem 8 and the valve disk 9, permitting adaptive movements of the valve disk.

Figure 2:
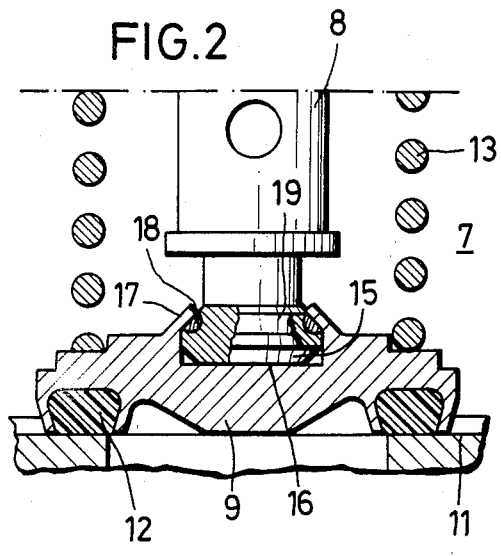
FIG. 2 is a view, to an enlarged scale, of a portion of the FIG. 1 magnetic valve.

FIG. 2 is an enlarged representation of the junction between the valve stem 8 and the valve disk 9 in accordance with FIG. 1. Between the beaded margin 17 and the head 15 there is the annular gasket 18 of the invention. For the partial accommodation of the annular gasket 18 there is provided a groove 19 in the portion of the head 15 which tapers on the neck side. Due to the presence of the annular gasket 18, the recess 16 forms a chamber separated from the valve interior 7, which is suitable for the insertion of a lubricant. This lubricant largely prevents the development of wear between the head 15 and the valve disk 9. The annular gasket 18 prevents the escape of the lubricant. As a result of the ring 18 situated between the beaded margin 17 and the head 15, these two parts no longer contact one another, so that undesirable detritus no longer develops in this area. Lastly, the annular gasket 18 produces a damping of the transmission of the abrupt movements of the valve stem 8 to the valve disk 9.

Figure 3:
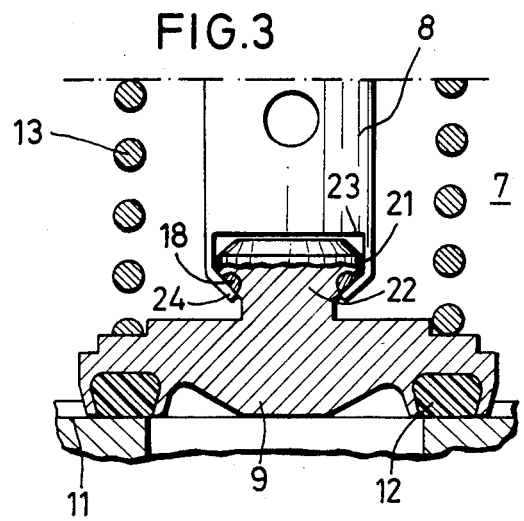
FIG. 3 is a diagrammatic sectional view of a portion of another embodiment of the magnetic valve.

FIG. 3 shows an embodiment in which the components producing the junction between the valve stem 8 and the valve disk 9 are exchanged. In this embodiment the valve disk 9 is equipped with a head 21 which has on the neck side the groove 22 for the annular gasket 18. The valve stem 8 is equipped with the recess 23 and the margin 24 which, when beaded over, envelops the head 21. The lubricant is contained in the recess 23 separated by the annular gasket 18 from the interior of the valve 7.

The head 15, 21, is formed essentially in each case by a central cylindrical section and two conical sections. The beaded margin 17, 24, extends in each case parallel to the conical section of the head on the neck side, in which the groove 19 or 22 is provided.

While there have been described what are at present considered to be the preferred embodiments of this invention, it will be obvious to those skilled in the art that various changes and modifications may be made therein without departing from the invention, and it is, therefore, aimed to cover all such changes and modifications as fall within the true spirit and scope of the invention.

We claim:

1. A magnetic valve for use with vacuum, comprising:
    a vacuum-tight casing having an interior and having two connection openings;
    a magnetic drive which includes a coil disposed outside of said casing and an armature disposed within said casing;
    a valve stem connected to said armature;
    a valve disk carried by said valve stem and associated with said connection openings;
    said valve disk and said valve stem being two components;
    a junction between said valve stem and said valve disk including a head-like configuration on one of said two components and a beaded margin enveloping the head-like configuration on the other of said two components;
    an annular gasket disposed between said head-like configuration and said beaded margin;
    a chamber in said other of said two components, said chamber including a lubricant; and
    the interior of said casing being an internal chamber separated by said annular gasket from said chamber.

2. A magnetic valve in accordance with claim 1, in which, on a neck side, said head-like configuration has a groove accommodating said annular gasket.

3. A magnetic valve in accordance with claim 1, in which said head-like configuration is on said valve stem and said beaded margin is on said valve disk.

* * * * *